Dec. 13, 1938. K. E. PEILER ET AL 2,139,770
FOREHEARTH FOR MOLTEN GLASS
Filed Sept. 24, 1935 3 Sheets-Sheet 2
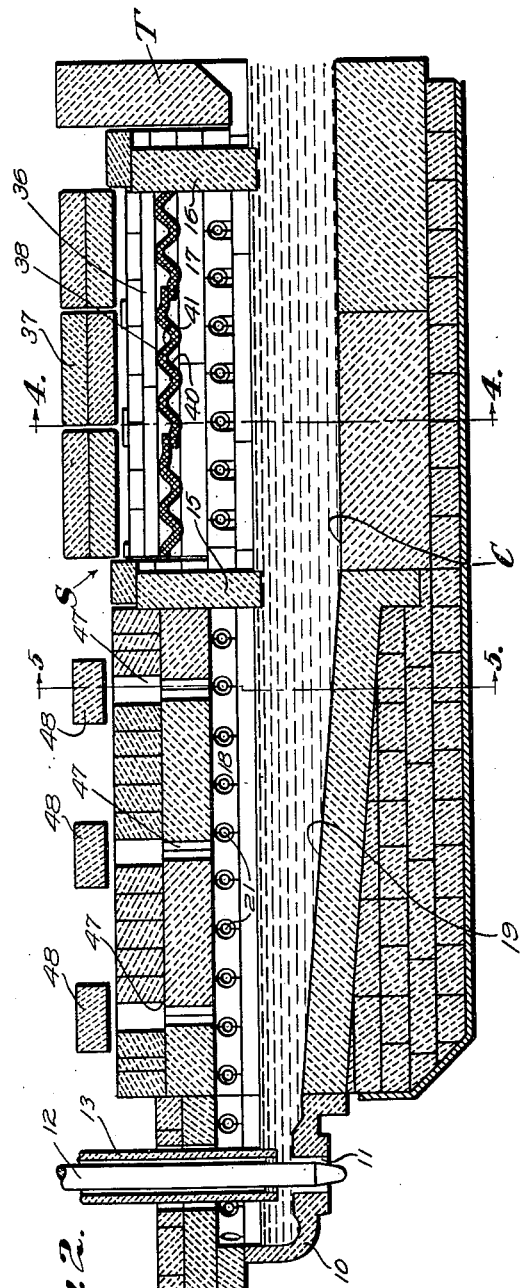

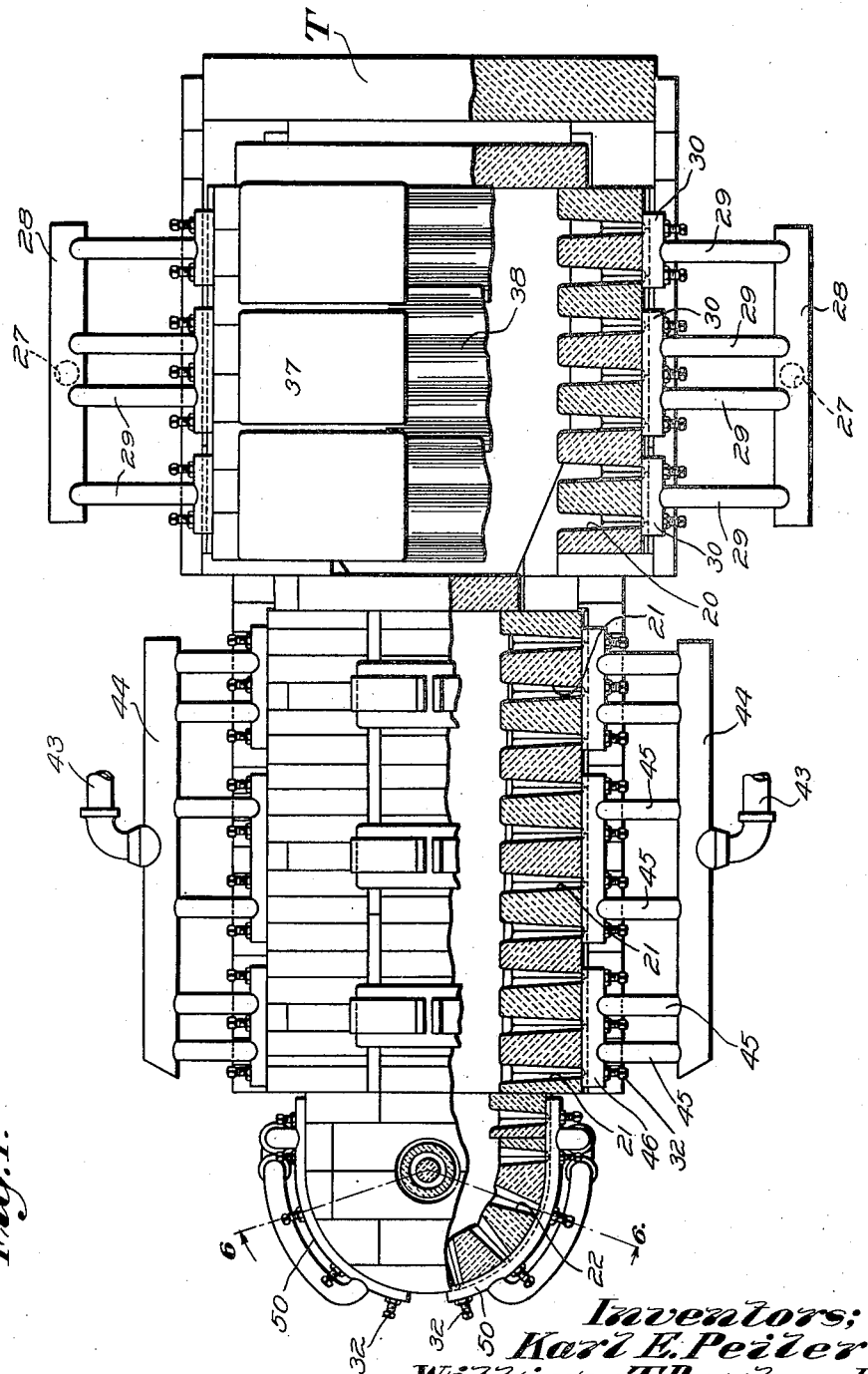

Dec. 13, 1938.    K. E. PEILER ET AL    2,139,770
FOREHEARTH FOR MOLTEN GLASS
Filed Sept. 24, 1935    3 Sheets-Sheet 3
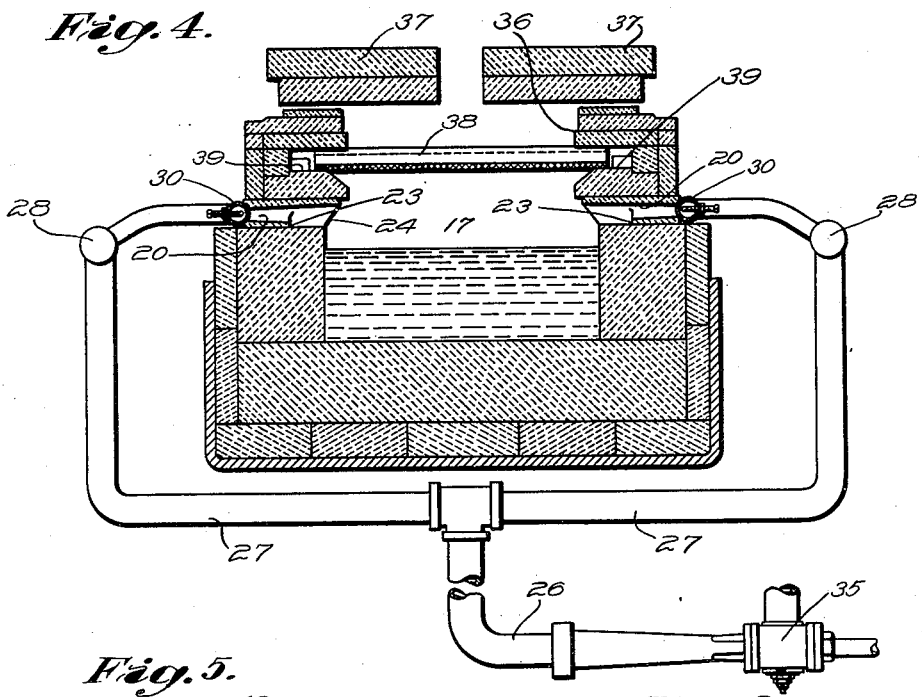
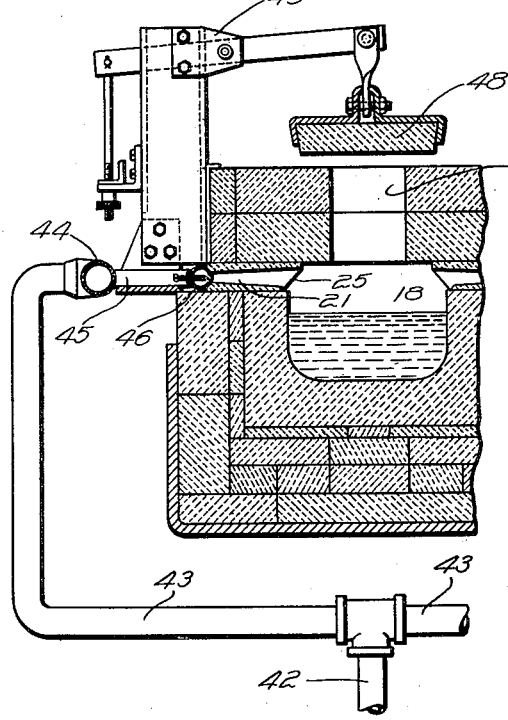
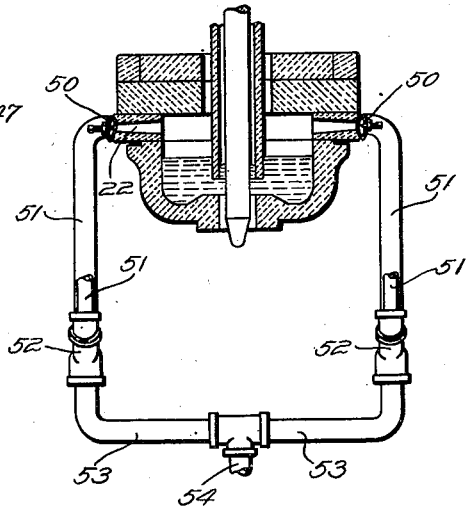

Patented Dec. 13, 1938

2,139,770

UNITED STATES PATENT OFFICE 2,139,770

FOREHEARTH FOR MOLTEN GLASS

Karl E. Peiler and William T. Barker, Jr., West Hartford, Conn., assignors to Hartford-Empire Company, Hartford, Conn., a corporation of Delaware Application September 24, 1935, Serial No. 41,381

11 Claims. (Cl. 49—55)

This invention relates to improvements in forehearths for receiving molten glass from a melting tank or like source of supply and for conducting such glass to a feed spout, basin or other delivery chamber from which glass is to be fed, gathered, drawn or otherwise removed.

The invention relates more particularly to improvements in forehearths of that type which is characterized by the provision of means at the sides of the forehearth for applying heat to the interior thereof and means at the top of the forehearth, especially in a longitudinal median portion thereof, for controlling radiation of heat from the interior of at least a portion of the forehearth.

Among the objects of the present invention are to provide for increased efficiency and economy of operation of a forehearth of the type referred to; to provide a forehearth of such construction and equipped with temperature regulating mechanism of such character and capability of operation as will permit a range of regulation of the temperature and condition of the glass in the forehearth that will be more extensive and at the same time more flexible than have been possible prior to the present invention; and to provide a forehearth structure equipped with temperature regulating mechanism and a heat-applying system designed and adapted to function in a regular and stable way after having been adjusted at any given time to meet the service requirements which exist at that time.

A further object of the invention is the provision of a forehearth provided with and adapted for the use of a novel arrangement of conduits and controllable burner devices for applying heat to the interior of the forehearth at locally controllable rates at different places along the glass conducting channel of the forehearth without subjecting the glass in such channel to unintended variations of heat such as have been occasioned in prior devices by different pressure conditions or changes in the character of the combustible mixtures in different fuel supply lines for the several burners or at the different burner nozzles.

A further object of the invention is the provision of novel and improved structure for controlling the loss of heat through the top of the forehearth.

A still further object of the invention is to provide suitable mechanism for regulating and controlling temperature conditions within the forehearth in such manner as to be practically unaffected by fluctuations of temperature and changes in draft conditions at the exterior of the forehearth.

Other objects and advantages of the invention will hereinafter be pointed out or will become apparent from the following description of a particular embodiment of the invention as shown in the accompanying drawings, in which:

Figure 1 is a plan view, with portions broken away and other portions shown in section, of a forehearth embodying the present invention;

Fig. 2 is a longitudinal vertical section through the forehearth;

Fig. 3 is a relatively enlarged sectional view of one of the burner nozzles and associated valve and fuel supply structure of the novel heating means with which a forehearth of the present invention may be equipped;

Fig. 4 is a transverse vertical section through a portion of the forehearth, the view being taken substantially along the line 4—4 of Fig. 2;

Fig. 5 is a fragmentary transverse vertical section through another portion of the forehearth, substantially along the line 5—5 of Fig. 2; and Fig. 6 is a transverse section through the glass delivery or feed spout portion of the forehearth, the view being substantially along the line 6—6 of Fig. 1 but omitting the structure which otherwise would appear in elevation in the background of such view.

The improved forehearth structure may include a glass conducting channel C, Fig. 2, having bottom and side portions and adapted at its inner end for connection with a glass melting tank. A portion of one wall of this tank, having a flow opening therein through which glass flows continuously from the tank to the channel C, is indicated at T, Figs. 1 and 2. A further showing of the tank and of the connection of the forehearth channel therewith is deemed unnecessary. A delivery spout 10, which constitutes the outer end portion of the forehearth channel, may have an outlet, indicated at 11, in its bottom. Glass may be fed through this outlet under the control of suitable regulating means, such as that which is represented in the drawings by the vertical plunger 12 and the tubular surrounding sleeve 13. Suitable refractory members, insulating brick, confining and supporting members, and other known structural parts may be used in building and supporting the forehearth channel.

The forehearth channel C is supplemented by and surmounted by a cover or top structure, generally designated S, Fig. 2, the details of the novel portions of which will hereinafter be pointed out.

Cooperating with this cover structure and with the channel are transverse refractory partition members 15 and 16 respectively, Fig. 2. The partition member 15 divides the space within the forehearth above the glass in the channel portion thereof into a rear temperature regulating chamber 17 and an outer or forward temperature regulating chamber 18. The rear transverse partition member 16 serves as a rear wall for the chamber 17 and prevents entry to the chamber 17 of heated gases from the space above the glass in the supply tank and of air at the juncture of the forehearth cover structure with the adjacent wall of the tank.

In the construction shown and as now preferred by us, the length of the rear chamber 17 is less than that of the forward or outer chamber 18 and the latter extends to the outer end of the delivery spout, or, in other words, includes the space above the glass in the delivery spout.

The bottom of the glass conducting channel C preferably is inclined upwardly, substantially as indicated at 19, Fig. 2, from about the plane of the front transverse partition 15 to the juncture of the delivery spout 10 with the remainder of the glass conducting channel structure of the forehearth. The glass in the forehearth channel thus may be of substantially uniform depth beneath the chamber 17 and of gradually decreasing depth from the rear end of the chamber 18 to the delivery spout portion of the forehearth. The body of glass in the delivery spout may be relatively shallow and of substantially uniform depth at all points of equal radial distance from the delivery outlet.

The side walls of the chambers 17—18, including the wall at the front or outer end of the glass delivery spout, are provided at intervals with substantially horizontal burner ports in the form of tunnels extending transversely through such walls. Those located in the side walls of the chamber 17 are designated 20, Figs. 1, 2 and 4. The burner ports of the side walls of the chamber 18 rearwardly of the delivery spout are designated 21 (Figs. 1, 2, and 5). The burner ports through the side walls above the space in the glass delivery spout are indicated at 22, Figs. 1, 2 and 6. Each of these burner ports is shown as enlarging in cross sectional area from its outer to its inner end.

As best seen in Fig. 4, the burner ports 20 have the bottom portions of their walls partially cut away at their inner ends, as indicated at 23, and have their inner end surfaces formed to slant downwardly and outwardly as indicated at 24. The burner ports 21, see Fig. 5, also have downwardly and outwardly inclined surfaces at their inner ends as indicated at 25. The burner ports 22 may have their inner ends terminating substantially flush with the inner surface of the adjacent side walls of the delivery spout structure, as shown in Fig. 6.

A fuel supply pipe 26, Fig. 4, has branch pipes 27 which respectively communicate with intermediate portions of primary manifolds 28, Fig. 1, at the opposite sides of the portion of the forehearth structure containing the chamber 17. Each primary manifold has branch pipes 29 communicating with secondary manifolds 30. These secondary manifolds 30 respectively may differ in length but each is secured firmly, as by a suitable refractory cement, to the adjacent portion of the forehearth side wall so as to cover the outer end or ends of one or a plurality of burner ports 20.

Each secondary manifold 30 is provided with a lateral opening in its inner side in register with each burner port 20 covered thereby, such lateral opening accommodating a short nozzle, such as that shown at 31 in Fig. 3. A needle valve 32 is adjustably mounted, as by means of a bushing 33, Fig. 3, in a portion of the secondary manifold 30, so as to control the volume of fuel mixture permitted to discharge from the secondary manifold through the associate nozzle 31. A jam nut 34 may be provided for securing such needle valve 32 in adjusted position.

With the arrangement just described, each nozzle 31 is supplied with a fuel mixture from the secondary manifold 30 and discharges such fuel mixture into the associate burner port 20 without any external air being permitted to dilute the fuel of the mixture at the burner port. For securing a desirable pre-mixing of air and combustible gaseous or liquid fuel, the main supply pipe 26, Fig. 4, may be provided with a suitable mixing device, such as that indicated generally at 35. It is unnecessary to illustrate and describe such a pre-mixing device and its operation in detail as the same are well known. It is sufficient in this specification to point out that such a device will cooperate with a source of gaseous or liquid fuel and a source of air to provide in the pipe 26 a combustible fuel mixture of the desired character for delivery to the primary manifolds 28.

The illustrated and described connections of the secondary manifolds with the primary manifolds and of the fuel discharge or burner nozzles with the secondary manifolds assure uniform delivery of the combustible fuel mixture from the several discharge nozzles into the respective burner ports 20, assuming like adjustments of the needle valves 32. This arrangement obviates or reduces to a minimum difficulties which heretofore have attended the attempted operation of a plurality of burners for supply heat to the interior of a forehearth chamber. These difficulties have been caused by unforeseen and irregular variations of the pressure or the character of the mixture in the respective fuel lines for the different burners or because of differences in the temperature, volume or velocity of the air streams mixing with the fuel at the different burners or adjacent to the discharge ends thereof.

Of course, differential adjustments of the several needle valves 32 will be attended by variations in the volume of the combustible mixture delivered by the respective valve-controlled nozzles 31.

The secondary manifolds are sufficiently short so that each may be secured firmly by suitable refractory cement to the adjacent wall of the forehearth and will remain in place without curling or warping when the forehearth is in service, even though temperatures or changes of temperature may be different at different places along the portion of the forehearth wall to which such secondary manifold has been applied.

The burner ports 20 are designed to serve as firing or combustion spaces, in which practically all the fuel mixture discharging thereinto from the nozzles 31 will be consumed before leaving the inner ends of the burner ports. The flames in the inner ends portions of the burner ports 20 will radiate heat downwardly onto the side portions of the glass stream in the forehearth channel. The heated gases and products of combustion will be directed inwardly toward the longitudinal median line of the chamber 17.

The invention provides novel structure at the top of the chamber 17 for cooperating with the above novel arrangement of heating means to regulably control the draft conditions in the chamber 17, the radiation of heat and the outflow of heated gases and products of combustion, and the changes of temperature of the glass in the underlying portion of the forehearth channel.

As shown, the top or cover structure of the forehearth above the chamber 17 is provided with a longitudinally extending central opening 36, Figs. 2 and 4. The effective width of this opening may, however, be varied by adjustment of cover blocks 37, Fig. 4, toward or away from each other. A muffle plate prevents direct escape of heated gases from the burner ports of the chamber 17 through the longitudinally extending central opening in the top structure and aids in controlling the direction of movement of the heated currents in the chamber 17 and in transit to the opening 36 in the top structure. This muffle plate may consist of transversely corrugated refractory tile 38 having high heat conducting properties and may cover the entire space within the chamber 17 above the level of the burner ports, the side edge portions of such muffle plate being received in suitably formed recesses 39 in the side walls of the forehearth structure. The muffle plate may be formed in one piece, or, as shown, of a plurality of cooperative sections.

The corrugations of the muffle plate provide transversely extending lower grooves 40 at its lower face, Fig. 2, and transversely extending upper grooves 41 at its upper face, as shown in the same view. The side edges of the muffle plate terminate short of the back walls of the recesses 39. Consequently, the heated gases passing transversely of the chamber 17 along the lower surface of the muffle will be conducted by the lower grooves 40 into the unoccupied portions of the recesses 39 whence they may pass along the upper grooves or channels 41 along the upper surface of the muffle to the opening 36 and thence between the spaced cover blocks 37 to the atmosphere. With this arrangement, not only is a relatively large area of heat radiating and dissipating surface provided at the top of the chamber 17 but the retardation of passage of heated gases from the space below the muffle plate to the longitudinal median opening in the top of the forehearth structure and the diffusion of such heated gases throughout the chamber 17 will assure economical and effective regulation of the temperature of the glass in the channel beneath the chamber 17. If positive cooling of such glass is required, the burner valves may be closed and relatively cool air may be drawn into the chamber 17 through the opening 36 and thence around the side edges of the muffle plate.

The means for applying heat to and regulably controlling the temperature of the glass in the channel beneath the chamber 18 preferably are independent of and separate from corresponding means for the chamber 17.

As shown in Fig. 5, a fuel mixture supply pipe 42, corresponding to the pipe 26, has branches 43 communicating with the middle portions of primary manifolds 44. Each primary manifold 44 has pipe connections 45 with secondary manifolds 46, as best seen in Fig. 1. The secondary manifolds 46 are provided with nozzles similar to those hereinbefore described for delivering fuel mixture to the respective burner ports 21. Each of the nozzles of the secondary manifolds 46 is controlled by one of the needle valves 32. Above the chamber 18, the top structure may be provided in its longitudinal median portion at intervals with vertical ports 47, the effective area of which may be regulated by suitable adjustable cover blocks 48. As shown in Fig. 5, each cover block 48 may be adjustably supported by suitable adjusting and supporting mechanism, indicated generally at 49. Radiation of heat, egress of heated gases from and draft conditions in the chamber 18 thus may be regulated independently of the chamber 17 and within a wide range of adjustments according to particular requirements at different times.

Also, the means for applying heat to the space above the glass in the glass delivery bowl preferably is separate from the corresponding means for applying heat to the remainder of the chamber 18.

As shown, Figs. 1 and 6, the burner ports 22 through the walls of the space above the glass in the delivery bowl or outer end portion of the forehearth channel may be supplied with a suitable fuel mixture from nozzles of secondary manifolds 50, each of such nozzles being controlled by one of the needle valves 32. The secondary manifolds 50 are secured in the manner hereinbefore described to the walls of the delivery portion of the forehearth so that the nozzles thereof are in operative relation with the outer ends of the ports 22 and indraft of air to the latter is prevented.

The secondary manifolds 50 are supplied with the fuel mixture by pipes 51 which connect these secondary manifolds 50 with primary manifolds 52. The latter in turn are supplied with fuel mixtures by branches 53 of a main fuel supply pipe 54, Fig. 6, which corresponds with each of the pipes 42 and 26, Figs. 5 and 4, respectively.

It will be understood from the foregoing description of structural features of the improved forehearth and of the character and mode of operation of the various individually adjustable heat applying and temperature regulating mechanisms of such forehearth that the glass entering the forehearth channel may be brought to a desired condition of temperature and viscosity throughout practically its entire cross-section at a relatively early stage in its travel in the forehearth channel and may be kept in that condition for the remainder of its travel in such channel and until such glass has reached the feed outlet or other place at which glass is removed from the forehearth. This makes for desirable homogenization of the glass fed or otherwise removed from the forehearth. Even if the desired condition of temperature and viscosity cannot be attained at such an early stage in particular cases in which the required correction of temperature is especially extensive or difficult to effect, the capabilities of adjustment of the respective temperature regulating agencies and the cooperative results of their several operations will permit the correction required by the time the glass reaches the feed bowl or delivery end portion of the forehearth channel.

An important advantage of the present invention is in the regularity of operation of the improved forehearth in effecting the desired correction and control of the temperature and condition of the glass passing through the forehearth channel after the adjustable control mechanisms have been given proper adjustments.

A forehearth structure and cooperative mechanism for regulating and controlling the temperature and condition of the glass therein in accordance with the principle of the present invention are also disclosed in our copending application, Serial No. 134,356, filed April 1, 1937 for improvements in Forehearth for molten glass. The claims of the present application are all limited to combined features of the invention as disclosed in this application and not included in the specific disclosure of our related application, Serial No. 134,356. It is intended that the latter application shall include claims generic to the novel features of invention common to its own disclosure and that of the present application.

The invention is not to be limited to the structure shown in the accompanying drawings and described in detail in the foregoing specification but is susceptible of embodiment in such other forms and modifications thereof as come within the scope of the appended claims.

We claim:

1. A forehearth having a glass flow channel and an enclosed space above the glass in said channel, means dividing said enclosed space transversely into a plurality of separate temperature regulating chambers, separate heating means for said chambers, separate means at the tops of the respective chambers for regulably controlling the escape of heat therefrom, a substantially horizontal muffle plate of relatively high heat conductivity extending across one of said chambers at a plane spaced below the top of said chamber, said muffle plate being located between the heating means for said chamber and the means for regulably controlling the escape of heat therefrom and means providing passages at intervals along each of the side edges of the muffle plate between the spaces above and below said muffle plate, respectively.

2. A forehearth having a glass flow channel and an enclosed space above the glass in said channel, means dividing said enclosed space transversely into a rear chamber and a front chamber, means located at intervals along the side walls of said rear chamber for applying heat to the interior thereof, said rear chamber having a longitudinally extending opening in the middle portion of its top, a substantially horizontal muffle plate of relatively high heat conductivity mounted in said rear chamber in spaced relation with the top of said chamber and above the level at which heat may be applied thereto by said heat applying means, and means providing passages at intervals along each of the side edges of the muffle plate between the spaces above and below said muffle plate, respectively.

3. A forehearth having a glass flow channel and an enclosed space above the glass in said channel, means dividing said enclosed space transversely into a rear chamber and a front chamber, means located at intervals along the side walls of said rear chamber for applying heat to the interior thereof, said rear chamber having a longitudinally extending opening in the middle portion of its top, a substantially horizontal transversely corrugated muffle plate of relatively high heat conductivity mounted in said rear chamber above the level at which heat may be applied thereto by said heat applying means, and means at the side edges of said muffle plate for establishing passages for the flow of gases between the lower and upper transverse grooves of said corrugated muffle plate.

4. A forehearth having a glass flow channel and an enclosed space above the glass in said channel, means dividing said enclosed space transversely into a rear chamber and a front chamber, means located at intervals along the side walls of said rear chamber for applying heat to the interior thereof, said rear chamber having a longitudinally extending opening in the middle portion of its top, a substantially horizontal muffle plate of relatively high heat conductivity mounted in said rear chamber below the level of the top of said chamber and above the level at which heat may be applied thereto by said heat applying means, means for varying the effective area of said longitudinally extending opening, means for regulably controlling the temperature of said front chamber, and means providing passages at intervals along each of the side edges of the muffle plate between the spaces above and below said muffle plate, respectively.

5. A forehearth having a glass flow channel and an enclosed space therein above the glass in said channel, means dividing said space into a front chamber and a rear chamber, means for regulably controlling the temperature of said front chamber, means located at the sides of said rear chamber for projecting heated gases across the side edge portions of the glass in the underlying portion of said channel toward the longitudinal median line of the lower portion of said rear chamber, a substantially horizontal muffle plate extending across said rear chamber and for substantially the full length thereof, said muffle plate being located above the means for projecting heated gases into the lower portion of said rear chamber at a plane spaced below the top of said chamber and constituting a good conductor of heat, means at the side edges of said muffle plate for conducting heated gases from the lower portion of said rear chamber to the portion thereof above said muffle plate, and means located along the approximate longitudinal median line of the top of said rear chamber for venting gaseous matter from the upper portion of said rear chamber to the atmosphere.

6. A forehearth having a glass flow channel and having a temperature regulating chamber above the glass in a portion of said channel, said chamber having burner ports at intervals along the side walls of the lower portion of said chamber, a transversely corrugated muffle plate extending across said chamber at a level above that of said burner ports, the side edges of said muffle plate extending into recesses in the side walls of said chamber and terminating short of the back walls of said recesses so as to provide passages for conducting gases between the portions of said chamber below and above said muffle plate, respectively, said chamber having a longitudinal opening in its top approximately above the middle portion of said muffle plate, and adjustable cover blocks for varying the effective width of said longitudinal opening.

7. A forehearth comprising a glass flow channel having its outer end portion formed to provide a glass feed bowl having a discharge outlet in its bottom, said forehearth having an enclosed rear temperature regulating chamber above the glass in a portion of the channel and a separate enclosed front temperature regulating chamber of greater length than the rear chamber and extending above the glass in the remainder of the channel, including said feed bowl, spaced burner ports in the side walls of said rear chamber and in the side walls and front wall of said front chamber, independently controlled burner nozzles for the respective burner ports, a fuel supply assembly including a single fuel and air premixing device for supplying the same mixture of fuel and air uniformly to all the burner nozzles of said rear chamber and for preventing ingress of atmospheric air to the outer ends of the burner ports of said rear chamber, similar independent fuel supply assemblies for supplying mixtures of fuel and air to the burner ports of the front chambers rearwardly of said feed bowl and to the burner ports of said feed bowl, a muffle plate of relatively high heat conductivity in said rear chamber above the inner ends of the burner ports thereof and below the level of the top of said chamber, means providing passages at the side edges of said muffle plate for conducting gases from the space beneath said muffle plate to the space thereabove, adjustable means at the top of said rear chamber for controlling the egress of heated gases and the radiation of heat therefrom, and separate means located at intervals along the top of said front chamber for regulably controlling the escape of heated gases therefrom.

8. A forehearth comprising a glass flow channel having its outer end portion formed to provide a glass feed bowl having a discharge outlet in its bottom, said forehearth having an enclosed rear temperature regulating chamber above the glass in a portion of the channel and a separate enclosed front temperature regulating chamber of greater length than the rear chamber and extending above the glass in the remainder of the channel, including said feed bowl, spaced burner ports in the side walls of said rear chamber and in the side walls and front wall of said front chamber, independently controlled burner nozzles for the respective burner ports, a fuel supply assembly including a single fuel and air pre-mixing device for supplying the same mixture of fuel and air uniformly to all the burner nozzles of said rear chamber and for preventing ingress of atmospheric air to the outer ends of the burner ports of said rear chamber, similar independent fuel supply asemblies for supplying mixtures of fuel and air to the burner ports of the front chamber rearwardly of said feed bowl and to the burner ports of said feed bowl, a muffle plate in said rear chamber above the inner ends of the burner ports thereof, means providing passages at the side edges of said muffle plate for conducting gases from the space beneath said muffle plate to the space thereabove, adjustable means at the top of said rear chamber for controlling the egress of heated gases and the radiation of heat therefrom, separate means located at intervals along the top of said front chamber for regulably controlling the escape of heated gases therefrom, the front chamber and the portion of the glass flow channel therebeneath being of less width than the rear chamber and the portion of the flow channel beneath the latter.

9. A forehearth comprising a glass flow channel having its outer end portion formed to provide a glass feed bowl having a discharge outlet in its bottom, said forehearth having an enclosed rear temperature regulating chamber above the glass in a portion of the channel and a separate enclosed front temperature regulating chamber of greater length than the rear chamber and extending above the glass in the remainder of the channel, including said feed bowl, spaced burner ports in the side walls of said rear chamber and in the side walls and front wall of said front chamber, independently controlled burner nozzles for the respective burner ports, a fuel supply assembly including a single fuel and air pre-mixing device for supplying the same mixture of fuel and air uniformly to all the burner nozzles of said rear chamber and for preventing ingress of atmospheric air to the outer ends of the burner ports of said rear chamber, similar independent fuel supply assemblies for supplying mixtures of fuel and air to the burner ports of the front chamber rearwardly of said feed bowl and to the burner ports of said feed bowl, a muffle plate in said rear chamber above the inner ends of the burner ports thereof, means providing passages at the side edges of said muffle plate for conducting gases from the space beneath said muffle plate to the space thereabove, adjustable means at the top of said rear chamber for controlling the egress of heated gases and the radiation of heat therefrom, separate means located at intervals along the top of said front chamber for regulably controlling the escape of heated gases therefrom, the bottom of said flow channel sloping regularly from the feed bowl to the portion thereof beneath said rear chamber.

10. A forehearth comprising a glass flow channel having its outer end portion formed to provide a feed bowl having a bottom discharge outlet, said forehearth having a rear temperature regulating chamber above the glass in a rear portion of said channel and having a front temperature regulating chamber above the glass in the remainder of the channel, including the feed bowl, said forehearth having spaced burner ports in the form of elongate continuous tunnels extending transversely through the side walls of said rear chamber, through the side walls of the front chamber rearwardly of said feed bowl, and through the side and front walls of the space above the glass in the feed bowl, all of said burner ports enlarging toward their inner ends and being of sufficient length and area to constitute combustion chambers, the ports in the side walls of the rear chamber and in the side walls of the front chamber rearwardly of said feed bowl having their inner end walls beveled downwardly and outwardly, the ports of said rear chamber having their bottom walls cut away from the inner ends of said ports for part of their length, and individually controllable means at the outer ends of the respective ports for introducing into said ports pre-mixed air and gas of such characteristics and pressure that practically complete combustion thereof will take place in said ports.

11. A forehearth having a glass flow channel comprising side walls extending above the level of the glass in said channel, means for projecting heated gases into the space between said side walls above the glass in the channel, a substantially horizontal muffle plate of relatively high heat conductivity extending across the space between said side walls above the level of the means for projecting heated gases into said space, and means providing passages at the sides edges of said muffle plate for the escape of gases from the space below said muffle plate.

KARL E. PEILER.
WILLIAM T. BARKER, Jr.